June 12, 1956 R. A. McCALLUM 2,750,180
HORIZONTAL AND SHEARING KERF CUTTING MACHINE
Filed Aug. 22, 1952 3 Sheets-Sheet 1

INVENTOR.
Robert A. McCallum
BY
Murray G. Gleeson
Attorney

June 12, 1956   R. A. McCALLUM   2,750,180
HORIZONTAL AND SHEARING KERF CUTTING MACHINE
Filed Aug. 22, 1952   3 Sheets-Sheet 2
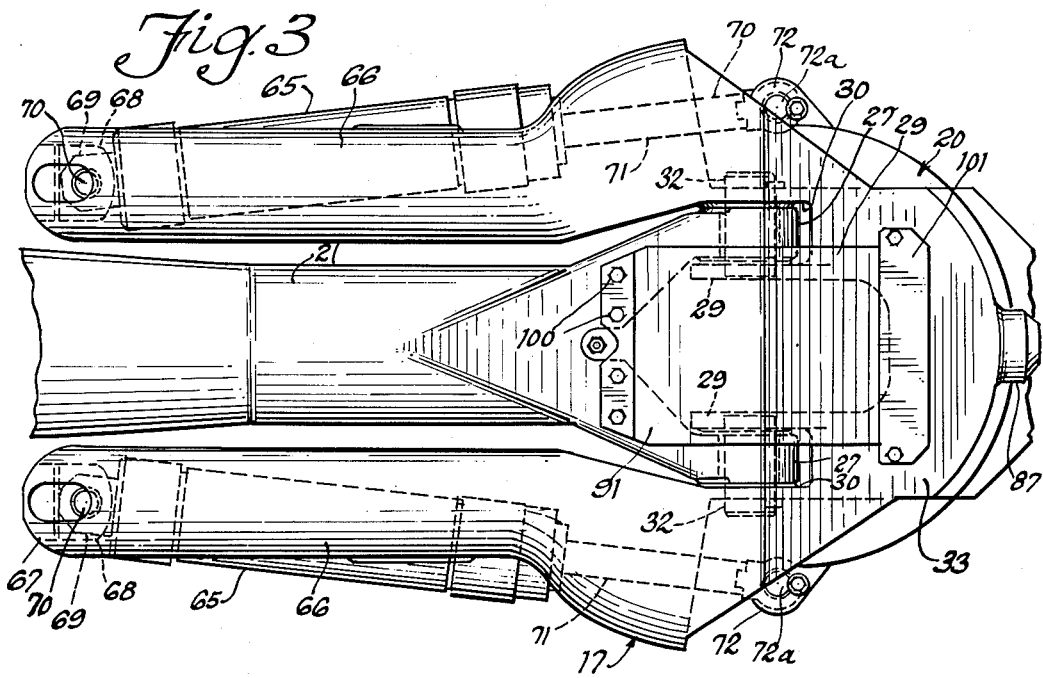
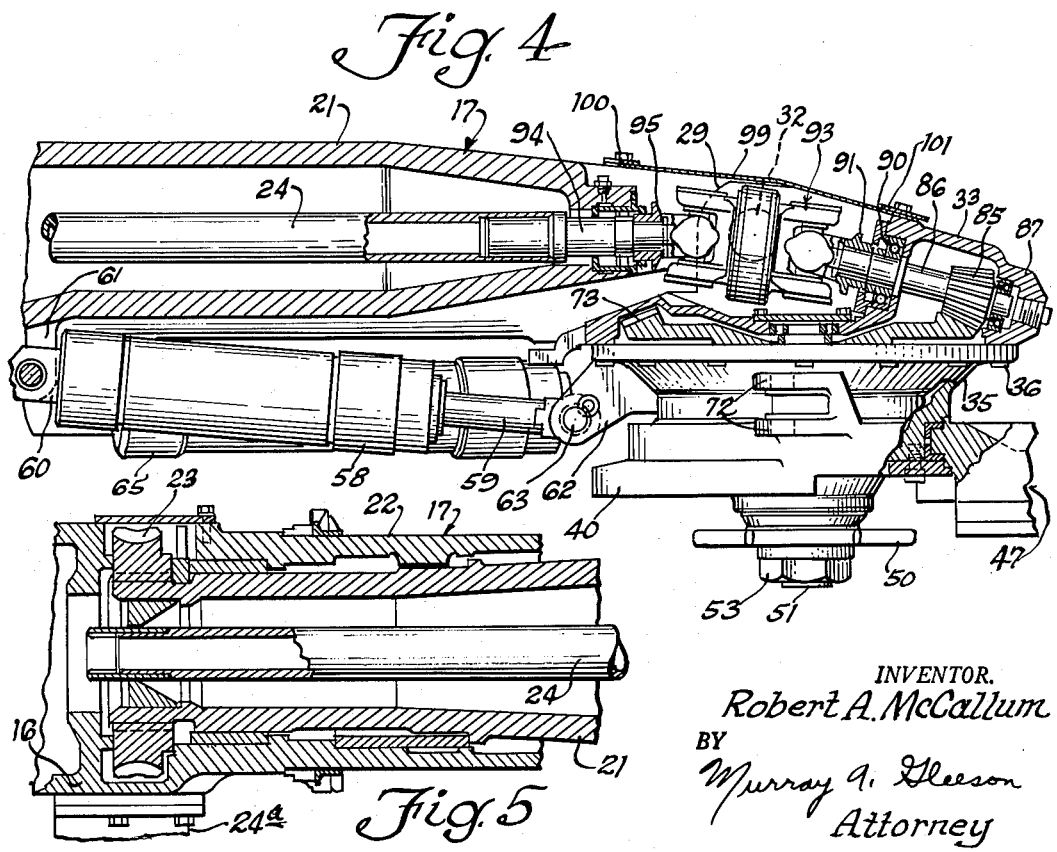
INVENTOR.
Robert A. McCallum
BY
Murray A. Gleeson
Attorney June 12, 1956  R. A. McCALLUM  2,750,180
HORIZONTAL AND SHEARING KERF CUTTING MACHINE
Filed Aug. 22, 1952  3 Sheets-Sheet 3

INVENTOR.
Robert A. McCallum
BY
Murray A. Gleeson
Attorney

United States Patent Office 2,750,180
Patented June 12, 1956

2,750,180

HORIZONTAL AND SHEARING KERF CUTTING MACHINE

Robert A. McCallum, Clarendon Hills, Ill., assignor to Goodman Manufacturing Company, Chicago, Ill., a corporation of Illinois Application August 22, 1952, Serial No. 305,742

6 Claims. (Cl. 262—28)

This invention relates to improvements in kerf cutting machines of the combination top cutting, bottom cutting and shearing type.

A principal object of my invention is to provide a novel and improved form of kerf cutting machine which will cut horizontal kerfs along the mine bottom or roof and shearing kerfs along either rib arranged with a view toward increasing the cutting range of the cutter bar without increasing the size of the machine.

Another object of my invention is to provide a novel and improved tilting support for the cutter head and cutter bar of a combination top cutting, bottom cutting and shearing kerf cutting machine so arranged as to increase the tilting range of the cutter bar and enable the size of the cutter head and support therefor to be reduced.

A further object of my invention is to provide a compact adjustable support for the cutter bar of a combination horizontal cutting and shearing kerf cutting machine together with an improved and compact drive arrangement for the cutter chain, efficiently driving the chain in all positions of adjustment thereof and affording an increased cutting range for the cutter bar.

A still further object of my invention is to provide a novel and improved form of drive for the cutter chain of a combination kerf cutting machine including a bevel gear and pinion drive wherein the axis of the bevel pinion is inclined with respect to the axis of the bevel gear at an angle of less than 90°, and wherein a universal coupling is used to drive the bevel pinion and is disposed in close proximity to and is intersected by the axis of the bevel gear and is always within the extended limits of the boom so as to afford an efficient drive to the bevel pinion requiring less head room than formerly and increasing the range of tilting movement of the cutter bar.

These and other objects of my invention will appear from time to time as the following specification proceeds and with reference to the accompanying drawings wherein:

Figure 3 is an enlarged fragmentary plan view of the forward end portion of the machine showing the support for the cutter head on the roll-over boom;

Figure 4 is a view in side elevation shownng the roll-over boom and cutter head with the boom broken away and shown in longitudinal section and certain parts of the cutter head broken away and certain other parts thereof shown in longitudinal section;

Figure 5 is a longitudinal sectional view showing the rear end portion of the roll-over boom and the support therefor on the motor casing.

Figure 1:
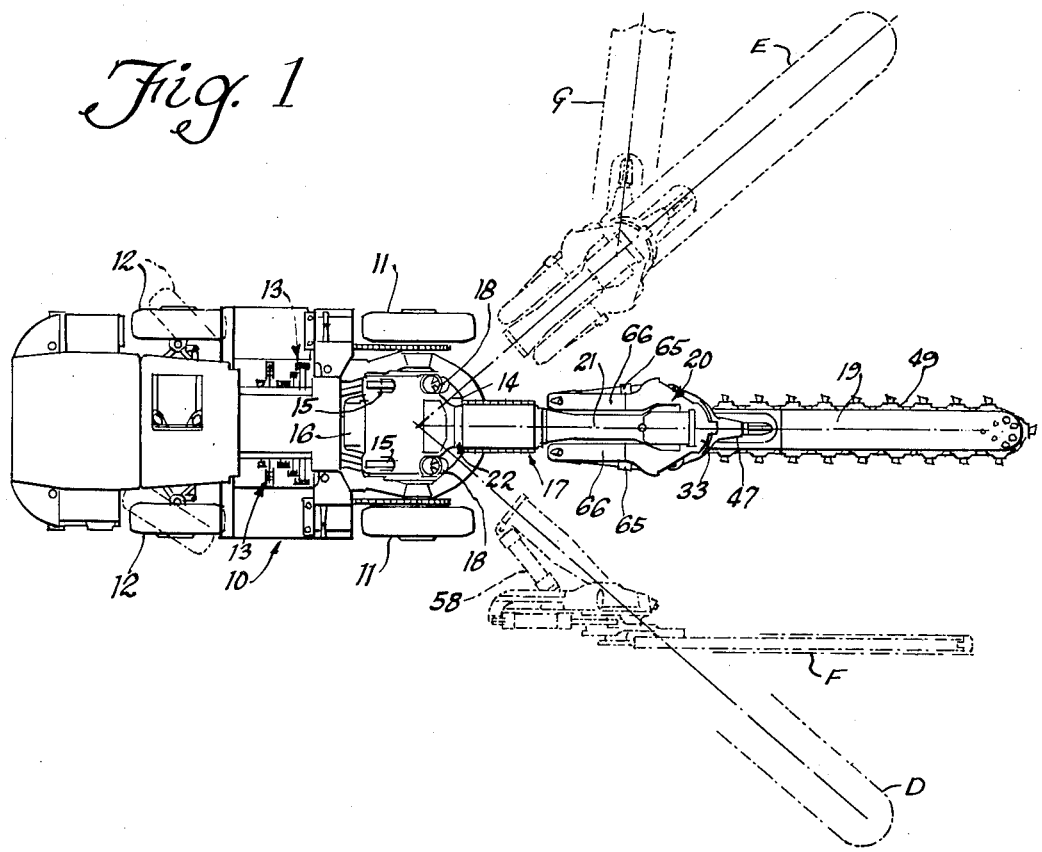
Figure 1 is a top plan view of a wheel mounted kerf cutting machine constructed in accordance with my invention and showing generally the cutter bar and cutter head and the range of lateral adjustment thereof.
Figure 2:
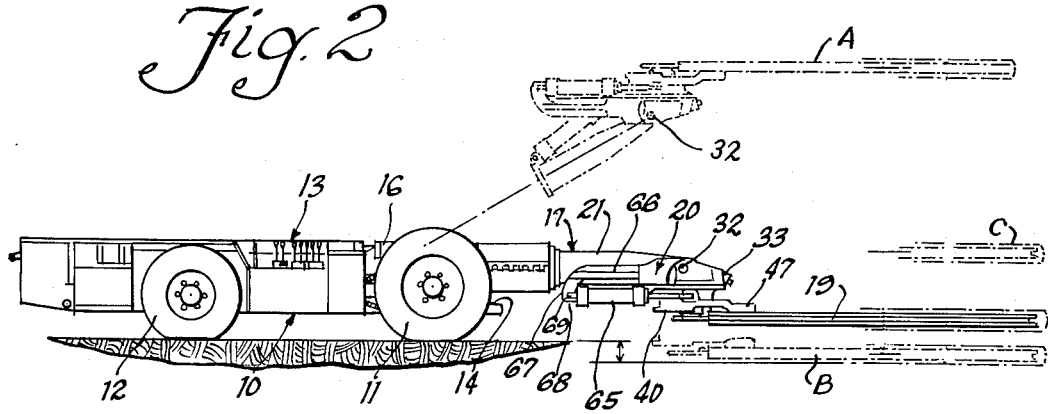
Figure 2 is a view in side elevation of the machine shown in Figure 1 showing the vertical range of adjustment of the cutter bar for horizontal cutting.

In Figures 1 and 2 of the drawings, the kerf cutting machine is shown as being a rubber tire mounted type of kerf cutting machine including a main frame 10 mounted on front drive wheels 11, 11 and rear steering wheels 12, 12. The front drive wheels may be simultaneously or independently driven by individual fluid motors (not shown), as shown in a companion application Serial No. 316,046, filed by me on October 21, 1952. The rear steering wheels may also be steered by hydraulically operated cylinders under the control of valve mechanism 13 on each side of the machine between the drive and steering wheels therefor, as in another companion application Serial No. 316,045 filed by me on October 21, 1952. The drive and steering mechanisms for the wheels 11 and 12 are fully shown and described in the aforementioned companion applications so need not herein be shown or described further.

A turntable 14 is rotatably supported at the forward end of the machine between the front drive wheels 11, 11 and has two laterally spaced upwardly and rearwardly extending trunnion supports 15, 15. A motor 16 of a cuttting element 17 is shown as being transversely pivoted to said trunnion supports.

The motor 16 and cutting elements 17 are transversely tilted by means of cylinders and pistons, generally indicated by reference character 18, at the forward end of the turntable 14 and interposed between said turntable and motor. Said cylinders and pistons may be controlled and connected between the turntable and motor in any well known form, and are no part of the present invention so need not herein be shown or described in detail. The cylinders and pistons 18, 18 form a means for adjusting the elevation of a cutter bar 19 carried by a cutter head 20 on the forward end of a roll-over boom 21, extending forwardly from the motor 16. The roll-over boom 21 may thus be angularly positioned by the cylinders and pistons 18, 18 to position the cutter bar 19 in the extreme top cutting position A shown in Figure 2 and in an extreme lowermost position B shown in this figure. The boom 21 when rotated may also vary the range of cutting of the cutter bar 19 from the solid line position shown in Figure 2 to the broken line position C shown in this figure.

The turntable 14 may further swing the cutter bar horizontally from the broken line position D shown in Figure 1 to the broken line position E shown in this figure for cutting a horizontal kerf in the working face in a manner usual to machines of this type and form no part of my present invention so is not herein shown or described further.

The motor 16 has an elongated cylindrical bearing support portion 22 projecting forwardly from its motor casing, within which is journalled the roll-over boom 21 for rotation about an axis extending longitudinally of said motor. The boom 21 forms a trunnion support at its forward end for the cutter head 20 and cutter bar 19 and may be rotated to position the cutter bar for cutting in the desired plane by means of a worm and worm gear drive 23 at the rear end of said boom which may be of a self locking type. The worm and worm gear drive 23 may be driven from an individual fluid motor 24a under the control of the valve mechanism 13.

The roll-over boom 21 has a drive shaft 24 extending therealong, coaxial with the axis of turning movement thereof, which is driven from the forward end of the shaft for the motor 16 and which may be directly coupled thereto. The drive shaft 24 affords a means for driving a cutter chain 49 about the cutter bar 19, as will hereinbefore more clearly appear as this specification proceeds.

The roll-over boom 21 is shown as being bifurcated at its forward end. The furcations of the bifurcated forward end portion of the boom 21 terminate into trunnion or bearing supports 27, 27 for the cutter head 20. The bearing supports 27, 27 are shown as being interleaved by spaced inner upright ears 29, 29 of the cutter head 20 and spaced outer wall portions 30, 30 of said cutter head. Transverse pins 32, 32 extend through said ears, bearing supports 27, 27 and wall portions, to pivotally mount the cutter head 20 on the forward end of the boom 21 for tilting movement with respect thereto about an axis extending perpendicular to the longitudinal axis thereof and shown as intersecting the longitudinal axis of said boom. It should be understood, however, that the tilting axis of said cutter head need not intersect the longitudinal axis of said boom.

The cutter head 20 is shown in Figure 5 as including generally an upper casing portion 33 having a downwardly facing annular shouldered bearing surface 34 abutted by a corresponding shouldered bearing surface of an annular housing 35. The annular housing 35 is secured to the bearing surface 34 of the casing 33 as by cap screws 36 and has a lower shouldered annular recess 39, the shouldered portion of which is shown as facing the ground, and which has a cutter bar support 40, journalled thereon on flanged bearings 41, 41.

An annular retaining plate 43 abuts the flange of the lower bearing 41 and is secured to the bottom of the housing 34 as by cap screws 45, 45.

The cutter bar 19 is secured to a forwardly projecting outboard support portion 47 of the cutter bar support 40 and projects forwardly therefrom. The cutter bar may be of a well known form having a guide extending therearound for orbitally guiding the cutter bit carrying cutter chain 49 therearound. The cutter chain 49 may also be of a well known form, and is trained about and driven from a sprocket 50, shown as being splined on the lower end of a drive shaft 51. A nut 53, threaded on the end of said drive shaft and abutting said sprocket is provided to secure said sprocket to said shaft. The shaft 51 is journalled within the housing 35 coaxial with the axis of swinging movement of the cutter bar 19 and support 40, on an anti-friction bearing 54 mounted in a boss portion 55 of said housing, disposed within the annular open portion of the support 40. The upper end of the shaft 51 is journalled in an anti-friction bearing 56, carried in a cap 57 for the casing 33.

The cutter bar 19 and cutter head 20 are tilted about the axis of the pins 32, 32 to pivot the cutter bar 19 to cut parallel to the mine roof as in position A in Figure 2 or to cut parallel to either rib as in the broken line position indicated by reference character F in Figure 1, by means of a suitable fluid motor shown as being a cylinder and piston unit 58 having a piston rod 59 extensible therefrom (see Figure 4). The cylinder 58 has a pair of spaced ears 60, 60 extending rearwardly from its head end and which extend along opposite sides of an ear 61 depending from the boom 21 and are transversely pivoted thereto. The piston rod 59 extends between two spaced ears 62, 62 extending rearwardly and downwardly from the upper portion of the housing 35 when the cutter head 20 is in a bottom cutting position, and is pivotally connected thereto as by a pivot pin 63. The cylinder and piston unit 58 may be double-acting to tilt the cutter head 20 and cutter bar 19 in either direction, and to hold said cutter head and bar in fixed relation with respect to said boom. Tilting may be under the control of the valve mechanism 13 on the main frame 10.

The cutter bar support 40 and cutter bar 19 are shown as being swung about the axis of the sprocket 50 to either side of the longitudinal center of the boom 21, as for example to the broken line position indicated by reference character G in Figure 1 by means of two laterally spaced cylinder and piston units 65, 65 extending along each side of the boom 21. The cylinders 65, 65 are shown as being pivotally supported at their rear ends on support arms 66, 66 extending rearwardly from the wall portion 30 of the upper casing portion 33 of the cutter head 20 along opposite sides of the boom 21, and move transversely of said boom during tilting movement of the cutter bar. As shown in Figures 2 and 3, each arm 66 has a depending rear end portion 67 having two vertically spaced forwardly projecting ears 68, 68 between which extends an ear 69 extending rearwardly from the head end of the cylinder and piston unit 65, which is connected thereto as by a pivotal pin 70. A piston rod 71, extensible from the cylinder and piston unit 65 has a flattened outer end portion extending between two spaced ears 72, 72 extending radially outwardly from the annular cutter bar support 40 and pivotally connected thereto, as by a pivotal pin 72a. One cylinder and piston unit 65 will therefore swing the cutter bar 19 in one direction while the other cylinder and piston unit will return the cutter bar and swing it in an opposite direction in an obvious manner. The admission of fluid under pressure to the head ends of the cylinders 65, 65 may be under the selective control of the valve mechanism 13 on the main frame 10.

Figure 6:
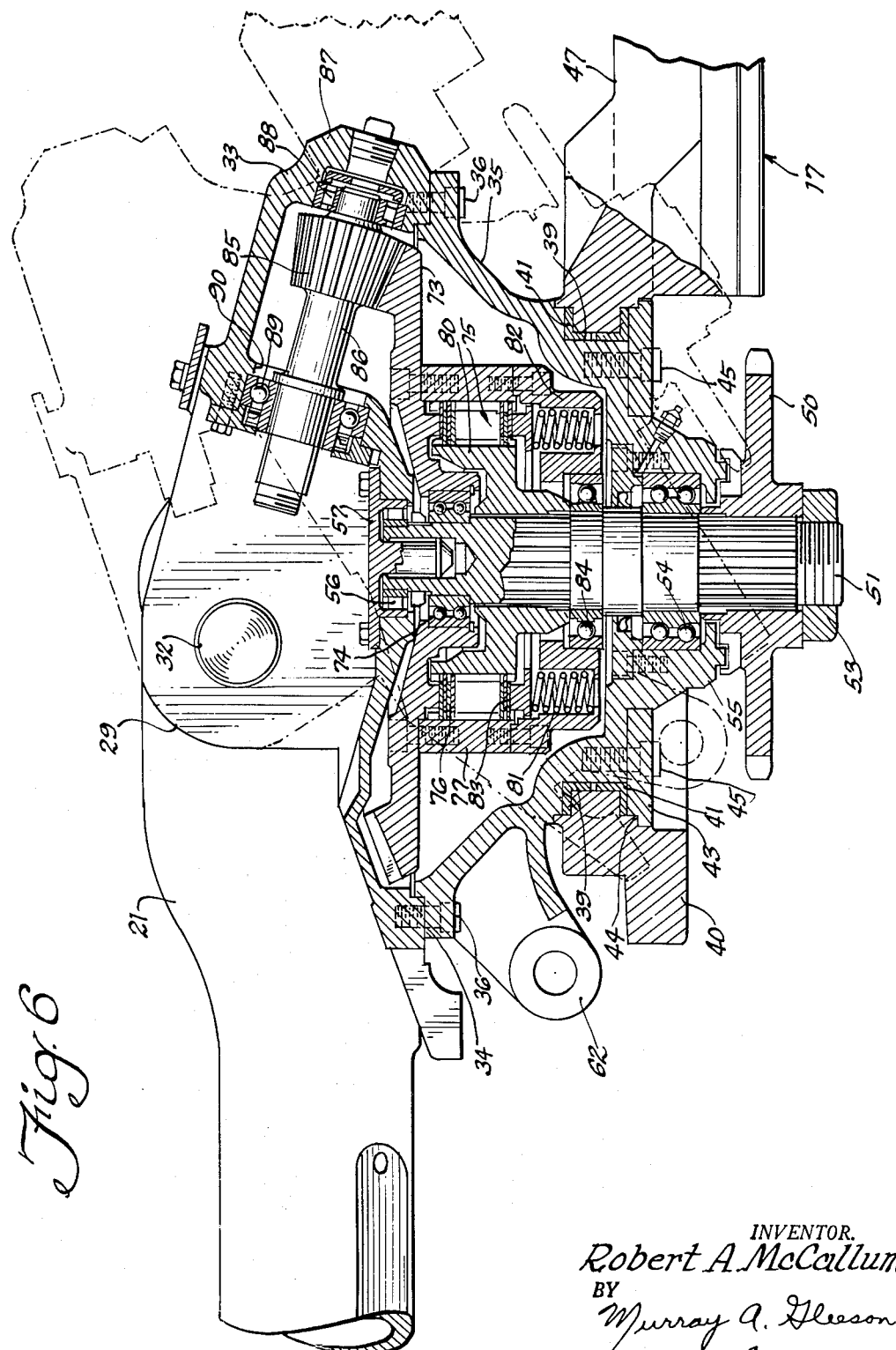
Figure 6 is an enlarged longitudinal sectional view taken through the cutter head and showing the drive arrangement for driving the cutter chain about the cutter bar.

The cutter chain drive shaft 51 is shown in Figure 6 as being driven from a bevel gear 73 journalled on an anti-friction bearing 74. An overload release clutch 75, herein shown as being a spring loaded friction slip disk clutch is shown as connecting the bevel gear 73 to the shaft 51 to drive the same. The clutch 75 may comprise a plurality of engaging friction disks 76, 76 alternate of which are splined within a casing 77 secured to the web of the bevel gear 73 and the intermediate disks of which are splined on a drive member 80, splined on the vertical shaft 51. A plurality of compression springs 81, 81 seated in an end closure member 82 for the casing 77 abut an engaging ring 83 maintaining the disks 76, 76 in frictional engagement with each other and loading the clutch to slip upon predetermined overload conditions. The end closure member 82 is shown as being journalled on the shaft 51 just beneath the drive member 80 on an anti-friction bearing 84.

The bevel gear 73 is shown as facing the tilting axis of the cutter head 20. A bevel pinion 85 on an angularly disposed shaft 86, journaled in the casing 33 of the cutter head 20 is shown as meshing with said bevel gear 73, for driving the same. As shown in Figures 4 and 6, the shaft 86 is inclined with respect to the horizontal when the cutter bar 19 is positioned for horizontal cutting. The shaft 86 and bevel pinion 85 are shown as being at the forward end of the cutter head 20 on the opposite sides of the axis of the pivot pins 32, 32 from the drive shaft 24. The shaft 86 is journaled at its forward end in a forwardly projecting boss portion 87 of the casing 33 on an anti-friction bearing 88. The shaft 86 is journaled adjacent its opposite end in an anti-friction bearing 89 mounted in an upright wall portion 90 of the casing 33, and facing the pivot pins 32, 32.

The rear or inner end of the shaft 86 extends rearwardly beyond the wall 90 and is splined to receive an internally splined coupling member 91 of a universal coupling 93 (see Figure 4). The shaft 24 is shown as having a coupling shaft 94 secured to and extending forwardly from the forward end thereof and having a coupling member 95 of the universal coupling 93 keyed to its forward end, for driving said coupling. The universal coupling 93 may be any well known form of coupling, of a type used to transmit heavy loads from a driving to a driven shaft where the shafts may move relative to each other, as when the cutter head 20 and cutter bar 19 are moved from the position shown by solid lines to that shown by broken lines in Figure 6. When the two shafts 24 and 86 are in axial alignment with respect to each other the center of the gimbal ring of the universal coupling is substantially in alignment with the center about which the cutter head 20 pivots and during tilting movement of the cutter head 20, the gimbal ring moves in an arcuate path intersecting the pivotal axis of the cutter head, and well within the extended limits of said cutter head and the extended limits of the boom 21, and closely adjacent the axis of rotation of the drive shaft 51.

The universal coupling 93 is shown as being protected by a flexible sliding cover plate 99 secured to the top surface of the boom 21 as by cap screws 100, 100 and slidably fitting beneath a retaining and guide plate 101 spaced above the upper surface of the casing 33. The cover plate 99 is shown as being of a relatively thin section, to readily conform to the angles of the cutter head 20 with respect to the boom 21 in the various positions of adjustment of said cutter head with respect to said boom.

It may be seen from the foregoing that the compactness and efficiency of drive arrangement herein shown, is partially attained by locating the bevel pinion at the front of the cutter head and on the opposite side of the axis of the sprocket 50 from the forward end of the drive shaft 24. It is further attained by providing a universal coupling to connect the extreme forward end of the drive shaft 24 with the extreme rear end of the shaft 86 and by locating this universal coupling so that a greater part of the coupling is within the limits of the boom between the furcations of the forward end portion thereof and closely adjacent the bevel gear 73, and close to the vertical axis of the shaft 51 and axis of swinging movement of the cutter bar 19.

It will be understood that various modifications and variations of the present invention may be effected without departing from the spirit and scope of the novel concepts thereof.

I claim as my invention:

1. In a kerf cutting machine of the class described, an elongated truck mounted boom tiltable about an axis disposed adjacent its rear end, a cutter head supported at the forward end of said boom for tilting movement with respect thereto about an axis extending transversely thereof, a cutter bar projecting from said cutter head and having a cutter bit carrying cutter chain orbitally guided thereabout, a sprocket meshing with said cutter chain and a drive shaft therefor journaled in said cutter head for rotation about an axis transverse to the axis of tilting movement thereof, a bevel gear on said drive shaft adjacent the opposite end thereof from said sprocket and facing away from said sprocket, a bevel pinion meshing with said bevel gear and disposed forwardly of the axis of rotation of said drive shaft, the extended axis of said drive shaft being closely adjacent the tilting axis of said cutter head, and a universal coupling member intersected by the extended axis of said drive shaft and movable in an arcuate path along the tilting axis of said cutter head during tilting movement thereof, and having driving connection with said bevel pinion.

2. In a kerf cutting machine of the class described, an elongated roll-over boom, means for supporting said boom for vertical movement about a transverse axis disposed rearwardly of its rear end and for rotatable movement about its longitudinal axis, a cutter head supported on the forward end of said boom for tilting movement about a transverse axis intersecting the longitudinal axis of said boom, a cutter bar projecting from said cutter head, a cutter bit carrying cutter chain guided for orbital movement about said cutter bar, a sprocket meshing with said cutter chain, a shaft journaled in said cutter head, for driving said sprocket, a bevel gear on the opposite end of said shaft from said sprocket and having teeth facing in the direction of the tilting axis of said cutter head, a bevel pinion meshing with said bevel gear, a shaft for said pinion journaled in said cutter head, said shaft and bevel pinion being spaced in advance of the tilting axis of said cutter head, a drive shaft journaled in said boom for rotation about an axis coaxial with the longitudinal axis thereof and terminating at the opposite side of the tilting axis of said cutter head from said bevel pinion, and a universal coupling connecting said drive shaft with said shaft for said bevel pinion, for driving the same in all positions of adjustment of said cutter head with respect to said boom, said universal coupling being intersected by the extended axis of said drive shaft.

3. In a kerf cutting machine of the class described, a wheel mounted truck, a motor mounted thereon for tilting movement with respect thereto about a transverse axis, a boom extending forwardly of said motor and supported thereon for movement about a longitudinal axis, a cutter head projecting forwardly of said boom and pivotally mounted thereon at the forward end thereof, for tilting movement about an axis extending transversely of the axis of said boom, a cylinder and piston connected between said boom and cutter head for tilting the same and holding said cutter head in various adjusted positions, a cutter bar projecting forwardly of said cutter head and having a cutter chain guided for orbital movement thereabout, a sprocket on said cutter head for driving said cutter chain, a drive shaft for said sprocket, a bevel gear on the opposite end of said drive shaft from said sprocket and having teeth facing the tilting axis of said cutter head, a bevel pinion meshing with said bevel gear and rotating about an axis inclined with respect to the horizontal when said cutter bar is in a horizontal cutting position, a shaft for said pinion disposed forwardly of the axis of said cutter chain drive shaft and the axis of tilting movement of said cutter head, a drive shaft extending along said boom and terminating rearwardly of the axis of tilting movement of said cutter head, and a universal drive connection connecting said last mentioned shafts together and intersected by the extended axis of said cutter chain drive sprocket in all positions of adjustment of said cutter head with respect to said boom.

4. A kerf cutting machine of the class described comprising a boom, a truck forming a support therefor, said boom extending in advance of said truck and being supported thereon for tilting movement with respect thereto about a transverse axis, a motor at the rear end of said boom, a shaft extending along the axis of said boom and driven by said motor, a cutter head transversely pivoted to the forward end of said boom and extending in advance thereof, a hydraulic motor interposed between said boom and cutter head for tilting the same about said transverse axis, a cutter bar projecting forwardly from said cutter head, support means for said cutter bar on said cutter head, mounting said cutter bar thereon for movement about an axis perpendicular to the axis of tilting movement of said cutter head, hydraulic motor means interposed between said cutter head and said cutter bar support means, for swinging said cutter bar support means with respect to said cutter head, a drive sprocket for said cutter chain disposed coaxial with the axis of swinging movement of said cutter bar, a shaft for said sprocket, a bevel gear on said shaft facing away from said sprocket, a bevel pinion meshing with said bevel gear and rotatable about an axis inclined with respect to the horizontal when said cutter head is in a horizontal cutting position, a shaft for said bevel pinion, and a universal coupling connecting said drive shaft on said boom with said bevel pinion shaft for rotatably driving the same in all positions of adjustment of said cutter head with respect to said boom, said universal coupling being intersected by the extended vertical axis of said drive shaft in all tilting positions of said cutter head with respect to said boom.

5. In a kerf cutting machine of the class described, a truck, a motor transversely pivoted to said truck, a boom projecting from said motor and mounted thereon for adjustment with respect thereto about an axis extending longitudinally thereof, a drive shaft extending along said boom and driven by said motor, a cutter head at the forward end of said boom, a cutter bar mounted on said cutter head for pivotal movement with respect thereto about an axis intersecting the extended longitudinal axis of said boom, a cutter chain movable about said cutter bar, a sprocket coaxial with the axis of pivotal movement of said cutter bar and meshing with said cutter chain, means for supporting said cutter head on said boom comprising a pair of laterally spaced ears extending from said cutter head, transverse pivotal connections between the forward end portion of said boom and said ears, a fluid motor interposed between said boom and cutter head for tilting the same about its axis of pivotal connection to said boom, a pair of spaced fluid motors extending along opposite sides of said boom, for pivoting said cutter bar about the axis of said sprocket, support arms for said last mentioned motors extending from said cutter head along each side of said boom, and means for driving said bevel gear and cutter chain sprocket from said drive shaft comprising a bevel gear coaxial with said sprocket, a bevel pinion meshing with said bevel gear, a shaft journaling said pinion in said cutter head forwardly of the axis of said sprocket, and a universal drive member connecting the forward end of said drive shaft with said bevel pinion shaft for driving the same in all positions of tilting adjustment of said cutter bar with respect to said boom, said universal drive member being in the space between said ears and being intersected by the extended axis of rotation of said bevel gear in all positions of tilting adjustment of said cutter head with respect to said boom.

6. A kerf cutting machine of the class described comprising a motor, a casing therefor having an elongated bearing support extending forwardly therefrom, a motor shaft coaxial with the axis of said bearing support, a roll-over boom journaled within said bearing support, a second motor on said motor casing for turning said boom and holding it in various positions of adjustment, a cutter head transversely pivoted on the forward end of said boom, a cutter bar extending from said cutter head and having a cutter chain orbitally guided thereabout, a sprocket for said cutter chain, means tilting said cutter head about its axis of pivotal connection to said boom, and means for driving said sprocket from said motor in all positions of tilting adjustment thereof with respect to said boom comprising a drive shaft extending along said boom in alignment with said motor shaft and driven thereby, a bevel gear for driving said sprocket, a bevel pinion at the forward end portion of said cutter head meshing with said bevel gear, said drive shaft terminating rearwardly of the axis of said bevel gear, and a universal coupling connecting said drive shaft with said bevel pinion and being intersected by the extended axis of rotation of said bevel gear, in all positions of said cutter head with respect to said boom.

References Cited in the file of this patent

UNITED STATES PATENTS

| 1,891,719 | McCullough | Dec. 20, 1932 |
| 2,562,881 | Baldwin et al. | Aug. 7, 1951 |

FOREIGN PATENTS

| 458,417 | Canada | July 26, 1949 |